United States Patent [19]
Sasaki

[11] Patent Number: 5,532,991
[45] Date of Patent: Jul. 2, 1996

[54] RECORDING AND/OR REPRODUCING APPARATUS AND METHOD OF CONTROLLING SAME

[75] Inventor: Yoshio Sasaki, Kanagawa, Japan

[73] Assignee: Sony Corporation, Tokyo, Japan

[21] Appl. No.: 513,721

[22] Filed: Aug. 11, 1995

Related U.S. Application Data

[62] Division of Ser. No. 223,554, Apr. 6, 1994, Pat. No. 5,491,677.

[30] Foreign Application Priority Data

Apr. 12, 1993 [JP] Japan ................... 5-107266

[51] Int. Cl.$^6$ ............................................ G11B 7/095
[52] U.S. Cl. .................... 369/44.350; 369/50; 369/54
[58] Field of Search ................. 369/44.26, 44.29, 369/44.31, 44.32, 44.33, 44.35, 44.36, 48, 50, 54, 58, 60, 32

[56] References Cited

U.S. PATENT DOCUMENTS

| 5,003,406 | 3/1991 | Hatanaka et al. .............. 360/10.2 |
| 5,291,467 | 3/1994 | Ishiwata et al. .............. 369/54 |

FOREIGN PATENT DOCUMENTS

0523985A2  1/1993  European Pat. Off. .

WO92/14242  8/1992  WIPO .

*Primary Examiner*—W. R. Young
*Attorney, Agent, or Firm*—Limbach & Limbach; W. Patrick Bengtsson

[57] ABSTRACT

A recording and/or reproducing apparatus for recording data on and/or reproducing data from a recording medium includes a recording and/or reproducing unit, a memory, a memory controller, and a servo control circuit, and a system controller. The recording and/or reproducing unit records data on the recording medium and/or reproduces recorded data from the recording medium. The memory temporarily stores data outputted from the recording and/or reproducing unit or input data to be recorded on the recording medium by the recording and/or reproducing unit. The memory controller controls the memory to write and read data such that data are read from the memory in a unit of time at a transfer rate lower than the transfer rate at which data are written in the memory in a unit of time. The servo control circuit supplies a servo control signal to the recording and/or reproducing means, and has an adjustable servo control gain. The system controller temporarily interrupts the recording of data on the recording medium or the reproducing of data from the recording medium with the recording and/or reproducing unit based on the amount of data stored in the memory, and controls the servo control circuit and the recording and/or reproducing unit to automatically adjust the servo control gain while the recording or reproducing of data is temporarily interrupted.

5 Claims, 7 Drawing Sheets

F I G. 2(a)

F I G. 2(b)

F I G. 2(c)

F I G. 2(d)

AMOUNT $D_R$ OF DATA STORED IN BUFFER MEMORY

RECORDING AND/OR REPRODUCING APPARATUS AND METHOD OF CONTROLLING SAME

This is a divisional of application Ser. No. 08/223,554, filed Apr. 6, 1994, now U.S. Pat. No. 5,491,677.

BACKGROUND

1. Field of the Invention

The present invention relates to a recording and/or reproducing apparatus and a method of controlling such a recording and/or reproducing apparatus. More particularly, the present invention relates to a recording and/or reproducing apparatus for intermittently recording and/or reproducing data.

2. Background of the Invention

There are known a reproducing apparatus for reproducing recorded data from a magneto-optical disc and an optical disc and a recording apparatus for recording data on a magneto-optical disc.

For reproducing data from or recording data on such an optical recording medium, an optical head radiates a light beam to the recording surface of the optical recording medium and detects a light beam reflected by the optical recording medium to reproduce the data recorded on the optical recording medium, or radiates a light beam to the recording surface of the optical recording medium to record desired data thereon. It is the customary practice to effect tracking and focusing servo control on the optical head for controlling the light beam to scan the recording surface properly.

The gain of a tracking or focusing servo control circuit, i.e., the gain of a tracking error signal or a focusing error signal generated by the tracking or focusing servo control circuit, has to be adjusted to an appropriate level for good servo control depending on the recording or reproducing apparatus.

The adjustment of the servo control signal gain results in adjustments of servo control characteristics such as servo control responses and shock resistance to respective states, so that suitable servo control characteristic states can be selected depending on how the apparatus are used, the environment in which they are used, and the disc used in the apparatus.

Heretofore, the servo control signal gain has been adjusted by varying the feedback resistance of an operational amplifier through adjusting a semifixed resistor during an adjustment process after the recording and reproducing apparatus have been manufactured. If a recording or reproducing apparatus is equipped with an automatic servo control signal gain adjusting circuit, then the servo control signal gain is automatically adjusted when no reproduced audio signal is outputted, e.g., immediately after an optical recording medium such as an optical disc has been loaded, or when no recording signal is inputted.

Actually, the servo control signal gain cannot be adjusted to a suitable level unless adjusted based on various conditions including the environment in which the recording or reproducing apparatus is used by the user, the disc itself for recording and reproducing data, the ambient temperature at which the recording or reproducing apparatus is used, the scanned position on the disc, i.e., the positional difference between radially inner and outer regions on the disc, and the aging of the disc and the apparatus. Since the servo control signal gain is adjusted only once by the semifixed resistor before the apparatus is shipped from the factory, however, the servo control signal gain is adjusted based on the above various conditions.

If the recording or reproducing apparatus is of the automatic servo control signal gain adjusting type, then the servo control signal gain can be adjusted based on those conditions that include the ambient temperature at which the disc is loaded. However, it is impossible to adjust the servo control signal gain to an optimum level based on other conditions including temperature changes during a subsequent reproducing or recording process and the positional difference between radially inner and outer regions on the disc.

If the servo control signal gain is not set to an optimum level, then the recording or reproducing capability of the apparatus is lowered by vibrations, disc scratches, surface fluctuations, disc eccentricities, etc.

One solution would be to effect automatic servo control signal gain adjustment during a reproducing process, for example. However, the automatic servo control signal gain adjustment during a reproducing process would requires a sine-wave signal to be added as an adjustment reference to the servo control signal, resulting in a reduction in the servo control capability. Therefore, a track jump would easily occur due to scratches or vibration, frequently causing a skip in the reproduced sound. For this reason, it is not preferable to carry out the automatic servo control signal gain adjustment during a reproducing process.

SUMMARY OF THE INVENTION

It is, therefore, an object of the present invention to provide a recording and/or reproducing apparatus which will solve the above-mentioned problem.

It is another object of the present invention to provide a method of controlling a recording and/or reproducing apparatus which method will solve the above-mentioned problem.

According to the present invention, there is provided a recording and/or reproducing apparatus for recording data on and/or reproducing data from a recording medium. The apparatus includes a recording and/or reproducing unit, a memory, a memory-controller, a servo controller and a system controller. The recording and/or reproducing unit is movable relatively to the recording medium and records data on the recording medium and/or reproduces recorded data from the recording medium. The memory temporarily stores data outputted from the recording and/or reproducing unit or input data to be recorded on the recording medium. The memory controller controls the memory to write and read data such that the data outputted from the recording and/or reproducing unit are written in the memory or the input data to be recorded on the recording medium which are temporarily stored in the memory are read from the memory at a transfer rate higher than the transfer rate at which the data outputted from the recording and/or reproducing unit which are temporarily stored in the memory are read from the memory or the input data to be recorded on the recording medium are written in the memory. The servo controller generates a servo control signal based on an error signal generated based on the data outputted from the recording and/or reproducing unit, and supplies the generated servo control signal to the recording and/or reproducing unit. The servo controller has an adjustable servo control gain. The system controller controls operation of the recording and/or reproducing unit, the memory controller, and the servo controller. The system controller has a first controller for controlling the recording and/or reproducing unit to intermittently record data on the recording medium or reproduce recorded data from the recording medium based on the amount of data stored in the memory, and a second controller for controlling the servo controller to automatically adjust the servo control gain thereof while the operation of the recording and/or reproducing unit to record or reproduce data is being interrupted.

According to the present invention, there is also provided a recording and/or reproducing apparatus including a recording and/or reproducing unit, a memory, a memory controller a servo controller and a system controller. The recording and/or reproducing unit records data on a recording medium and/or reproduces recorded data from the recording medium. The memory temporarily stores data outputted from the recording and/or reproducing unit or input data to be recorded on the recording medium by the recording and/or reproducing unit. The memory controller controls the memory to write and read data such that data are read from the memory in a unit of time at a transfer rate lower than the transfer rate at which data are written in the memory in a unit of time. The servo controller supplies a servo control signal to the recording and/or reproducing unit. The servo controller has an adjustable servo control gain. The system controller controls operation of the recording and/or reproducing unit, the memory controller, and the servo controller. The input data are recorded on the recording medium through the memory and the data reproduced from the recording medium are outputted through the memory. The system controller includes a unit for temporarily interrupting the recording of data on the recording medium or the reproducing of data from the recording medium with the recording and/or reproducing unit based on the amount of data stored in the memory, and controlling the servo controller and the recording and/or reproducing unit to automatically adjust the servo control gain while the recording or reproducing of data is temporarily interrupted.

According to the present invention, there is further provided a method of controlling a recording and/or reproducing apparatus having a memory for temporarily storing data outputted from a recording and/or reproducing unit or input data to be recorded on a recording medium, and a servo controller for generating a servo control signal based on an error signal generated based on the data outputted from the recording and/or reproducing unit, and supplying the generated servo control signal to the recording and/or reproducing unit, the servo controller having an adjustable servo control gain, the arrangement being such that the memory is controlled to write and read data such that the data outputted from the recording and/or reproducing unit are written in the memory or the input data to be recorded on the recording medium which are temporarily stored in the memory are read from the memory at a transfer rate higher than the transfer rate at which the data outputted from the recording and/or reproducing unit which are temporarily stored in the memory are read from the memory or the input data to be recorded on the recording medium are written in the memory, the method including the steps of controlling the recording and/or reproducing unit to intermittently record data on the recording medium or reproduce recorded data from the recording medium based on the amount of data stored in the memory, and controlling the servo controller to automatically adjust the servo control gain thereof while the operation of the recording and/or reproducing unit to record or reproduce data is being interrupted.

With the above arrangement, data are intermittently recorded on the recording medium and/or reproduced from the recording medium, and while the recording and/or reproducing of the data is being interrupted, the servo control gain of the servo controller is automatically adjusted. Since the servo control gain is adjusted while the recording and/or reproducing of the data is being interrupted, the servo control gain can be automatically adjusted irrespective of the recording and/or reproducing process of the recording and/or reproducing apparatus. Accordingly, the recording and/or reproducing apparatus can effect stable servo control operation with an optimum servo control gain which satisfies various conditions including a temperature change, aging, the condition in which the apparatus is used, the type of the disc, and different positions on the recording medium where data are recorded and reproduced. It is therefore possible to minimize any adverse effects which scratches on the recording medium, disturbance, and other externally induced factors may have on the recording and/or reproducing operation of the recording and/or reproducing apparatus.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIGS. 2(a) through 2(d) are diagrams illustrative of the manner in which a buffer memory of the recording and reproducing apparatus shown in FIG. 1 operates to write and read data.

FIGS. 3(a) through 3(c) are diagrams illustrative of the timing of writing/reading data in and from the buffer memory of the recording and reproducing apparatus shown in FIG. 1. FIG. 3(a) shows the timing of writing data in the buffer memory. FIG. 3(b) shows the timing of reading data from the buffer memory.

FIGS. 4(a) and 4(b) are diagrams illustrative of the manner in which data are transferred during a reproducing process of the recording and reproducing apparatus shown in FIG. 1.

DESCRIPTION OF THE INVENTION

Figure 1:
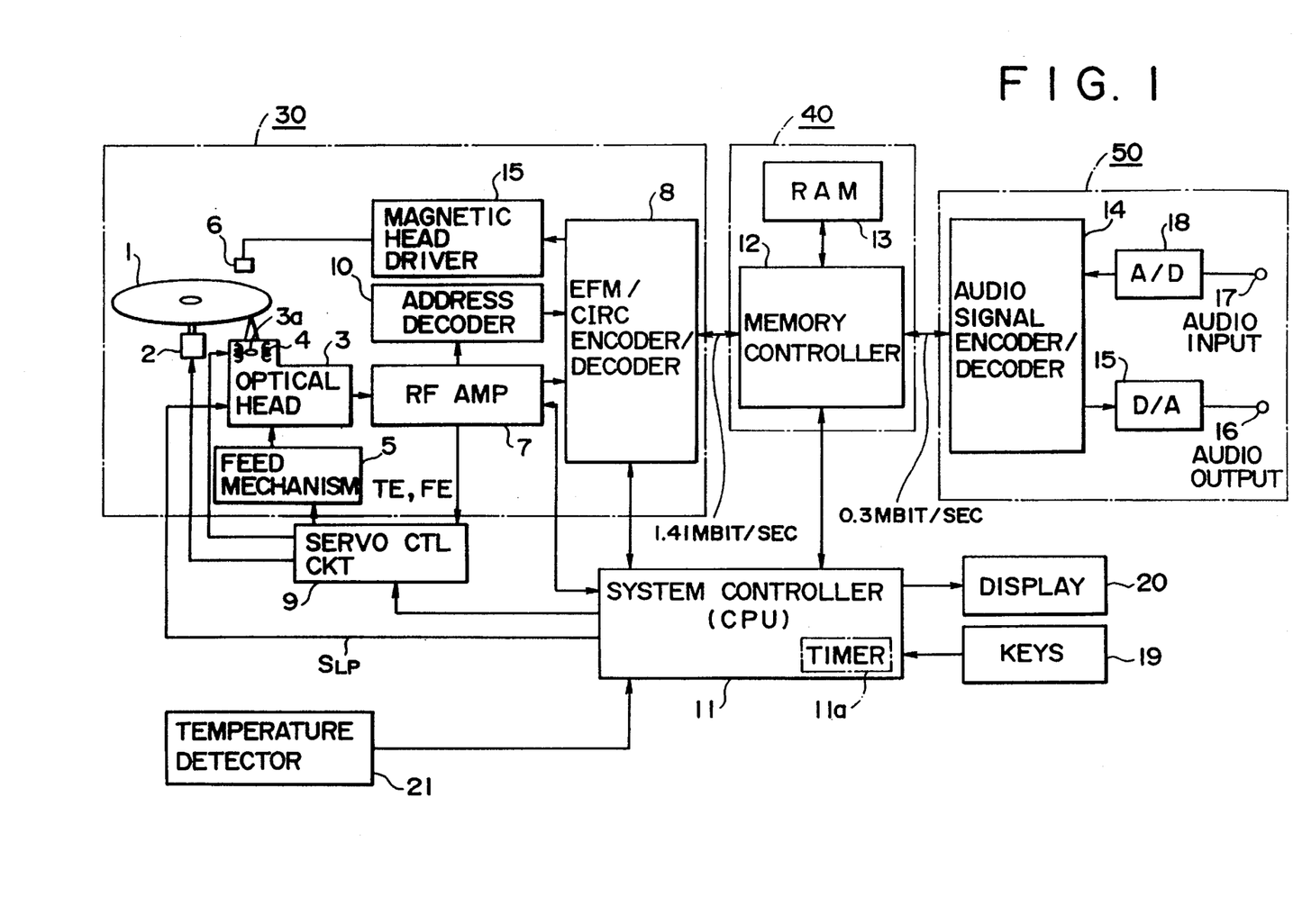
FIG. 1 is a block diagram of a portion of a magneto-optical disc recording and reproducing apparatus according to the present invention.

A recording and reproducing apparatus for recording data on and reproducing data from a recording medium according to the present invention will be described below with reference to FIGS. 1 through 7. The illustrated recording and reproducing apparatus employs a magneto-optical disc as the recording medium, by way of example. FIG. 1 shows in block form the recording and reproducing apparatus.

As shown in FIG. 1, the recording and reproducing apparatus includes a data transfer system for transferring data which are to be recorded or data which are reproduced. The data transfer system generally includes a data recording and/or reproducing unit 30 for recording and/or reproducing data on and from a magneto-optical disc, a temporary data storage unit 40 for temporarily storing reproduced data or entered data to be recorded, and a recording/reproduced signal processor 50 for compressing audio data and effecting conversion between analog and digital signals.

A magneto-optical disc 1 on which audio data are recorded or can be recorded is loaded in the data recording and/or reproducing unit 30. The loaded magneto-optical disc 1 can be rotated by a spindle motor 2. The data recording and/or reproducing unit 30 includes an optical head 3 for applying a light beam to the magneto-optical disc 1 in recording and reproducing processes. In a recording mode, the optical head 3 produces a light beam of a high level for heating recording tracks on the magneto-optical disc 1 up to the Curie temperature. In a reproducing mode, the optical head 3 generates a light beam of a relatively low level for detecting recorded data from a reflected light beam due to the magnetic Kerr effect.

The optical head 3 has a laser diode as a light beam source, an optical system including a deflecting beam splitter, an objective lens 3a, etc., and a photodetector for detecting a reflected light beam. The objective lens 3a is displaceable by an actuator 4 in a radial direction of the magneto-optical disc 1, i.e., a tracking direction, and in a direction parallel to the optical axis of the objective lens 3a, i.e., a focusing direction.

The data recording and/or reproducing unit 30 also includes a magnetic head 6 for applying a vertical magnetic field modulated by data to the magneto-optical disc 1. The optical head 3 and the magnetic head 6 are positioned one on each side of the magneto-optical disc 1 in alignment with each other. The optical head 3 and the magnetic head 6 are movable radially of the magneto-optical disc 1 by a feed mechanism 5.

In the reproducing mode, data detected from the magneto-optical disc 1 by the optical head 3 are supplied to an RF amplifier 7, which processes the supplied data to extract therefrom a reproduced RF signal, a tracking error signal TE, a focusing error signal FE, absolute positional information, address information, and a focusing monitor signal. The absolute positional information is recorded as a wobbling pregroove based on positional information radially on the magneto-optical disc 1. The tracking error signal TE and the focusing error signal FE are supplied to a servo control circuit 9. The address information is supplied to an address decoder 10. The absolute positional information and the focusing monitor signal are supplied to a system controller 11 that is composed of a microcomputer, for example.

The servo control circuit 9 generates various servo control signals based on the tracking error signal TE and the focusing error signal FE which are supplied thereto, a track jump command and a seek command from the system controller 11, and information indicative of the detected rotational speed of the spindle motor 2. Based on the generated servo control signals, the servo control circuit 9 operates the actuator 4 and the feed mechanism 5 to actuate the optical head 3 for focusing and tracking control, and also controls the spindle motor 2 to operate at a constant angular velocity (CAV) or a constant linear velocity (CLV). The servo control circuit 9 includes a circuit for automatically adjusting the gains of tracking and focusing servo control processes. The details of the servo control circuit 9 will be described below.

The reproduced RF signal is EFM-demodulated and CIRC-decoded by an encoder/decoder 8, and sent to the temporary data storage unit 40 in which it is temporarily written in a buffer memory 13 by a memory controller 12. Data are read from the magneto-optical disc 1 by the optical head 3 and the reproduced data are transferred from the optical head 3 to the buffer memory 13, i.e., transferred in the data recording and/or reproducing unit 30, intermittently at a rate of 1.41 Mbit/sec. The buffer memory 13 is composed of a RAM having a storage capacity of 1 Mbit or greater.

The data stored in the buffer memory 13 are read at such timing that the reproduced data will be transferred at a rate of 0.3 Mbit/sec, and delivered to the recording/reproduced signal processor 50 in which they are supplied to an encoder/decoder 14. In the encoder/decoder 14, the data are processed, e.g., to decode compressed audio data, and then converted into an analog signal by a D/A converter 15. The analog signal is then supplied from a terminal 16 to a amplifying circuit which outputs an amplified signal. For example, the analog signal from the terminal 16 is outputted as left and right audio signals from the amplifying circuit.

For writing data in and reading data from the buffer memory 13, the buffer memory 13 is addressed by write and read pointers that are controlled by the memory controller 12.

FIGS. 2(a) through 2(d) schematically show the concept of operation of the buffer memory 13 to write and read data. In FIGS. 2(a) through 2(d), it is assumed that the buffer memory 13 has a plurality of data storage areas to which respective addresses 0~n are assigned. Actually, the buffer memory 13 has storage areas other than those for audio signal data because it stores TOC (Table of Contents) data for controlling recording/reproducing processes, as well as the audio signal data.

Figure 2A:
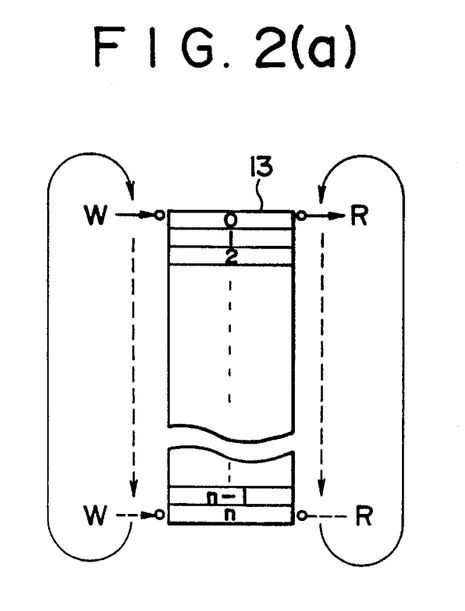
FIG. 2(a) shows controlled conditions of write and read pointers.

As shown FIG. 2(a), a write pointer (W) and a read pointer (R) are controlled in a ring or cyclic manner, i.e., are incremented successively through the addresses 0~n, and reset to the address 0 after they reach the address n.

Figure 2B:
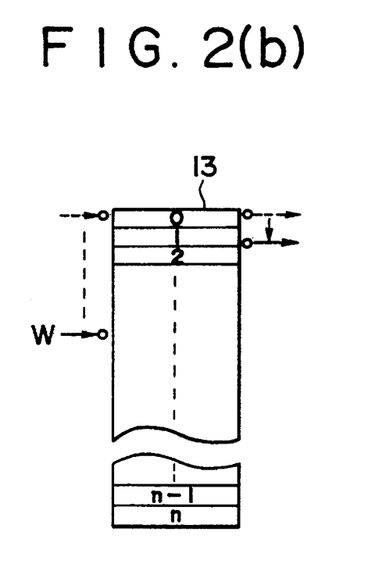
FIG. 2(b) shows the condition in which data are written according to the write pointer.

When a reproducing process is started and data are read from the magneto-optical disc 1 by the data recording and/or reproducing unit 30 and supplied to the temporary data storage unit 40, the write pointer (W) is incremented successively tow rite the data at the respective addresses in the buffer memory 13. Substantially concurrent with this, or when a certain amount of data is stored in the buffer memory 13, the read pointer (R) is also incremented successively to read the stored data from the respective addresses, and the read data are supplied to the encoder/decoder 14.

Figure 2C:
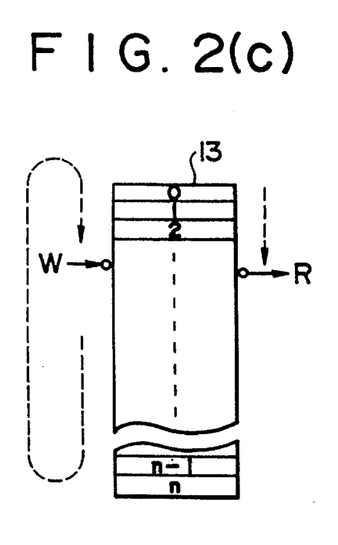
FIG. 2(c) shows the condition in which the write pointer catches up with the read pointer.

Since the write pointer (W) is incremented at a rate of 1.41 Mbit/sec. and the read pointer (R) is incremented at a rate of 0.3 Mbit/sec., the address indicated by the write pointer (W) catches up with the address indicated by the read pointer (R) at a certain time as shown in FIG. 2(c). That is, when the read pointer (R) indicates an address (x), the write pointer (W) indicates an address (x-1), whereupon the buffer memory 13 stores data to its full storage capacity.

At this time, the write pointer (W) stops being incremented, and the operation of the data recording and/or reproducing unit 30 to read data from the magneto-optical disc 1 is stopped. However, since the read pointer (R) is continuously incremented, the output of a reproduced audio signal is not interrupted.

Figure 2D:
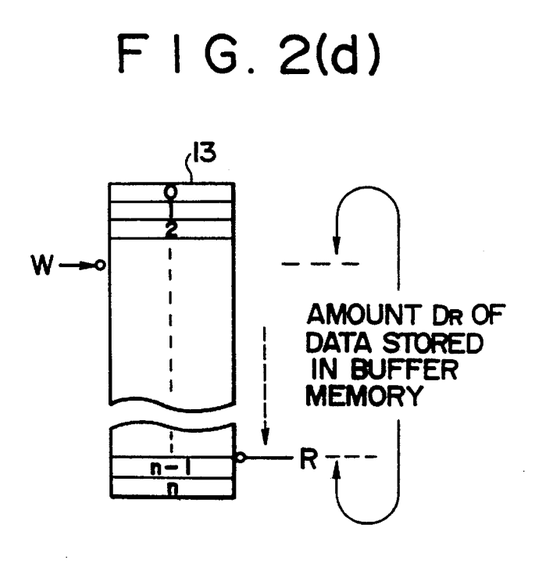
FIG. 2(d) shows the condition in which the amount of data stored in the buffer memory at a certain time is smaller than a preset amount.

Thereafter, only the reading of data from the buffer memory 13 is continued. It is assumed that the amount $D_R$ of data stored in the buffer memory 13 becomes smaller than a predetermined amount at a certain time, as shown in FIG. 2(d).

Then, the operation of the data recording and/or reproducing unit 30 to read data from the magneto-optical disc 1 is resumed, and the write pointer (W) starts to be incremented again. Data are continuously read from the magneto-optical disc 1 and the write pointer (W) is continuously incremented until the address indicated by the write pointer (W) catches up with the address indicated by the read pointer (R).

As described above, the operation of the data recording and/or reproducing unit 30 to write data in the buffer memory 13 is intermittently carried out.

Figure 3A:
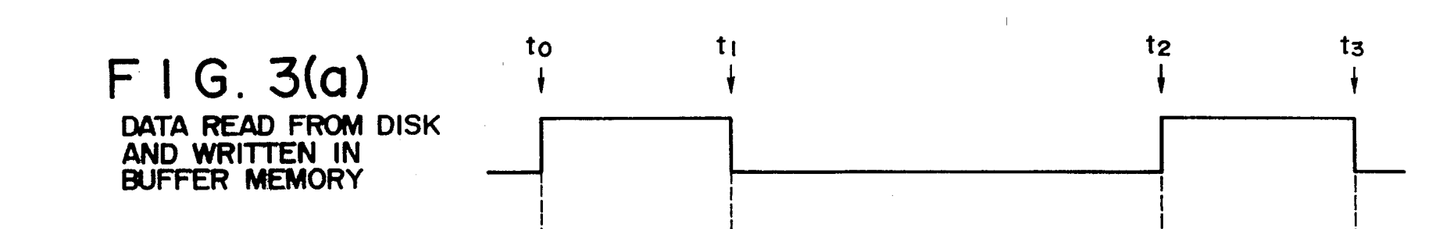
Figure 3B:
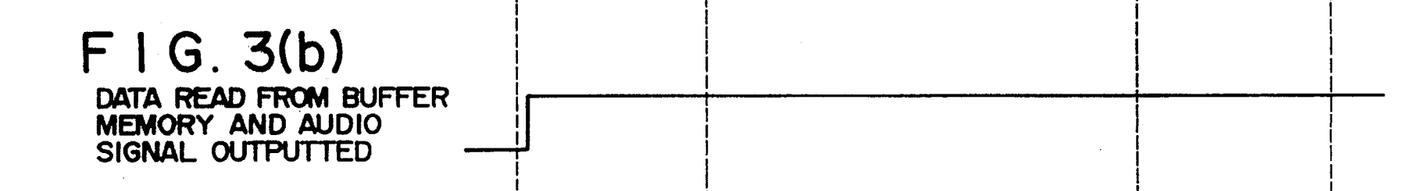
Figure 3C:
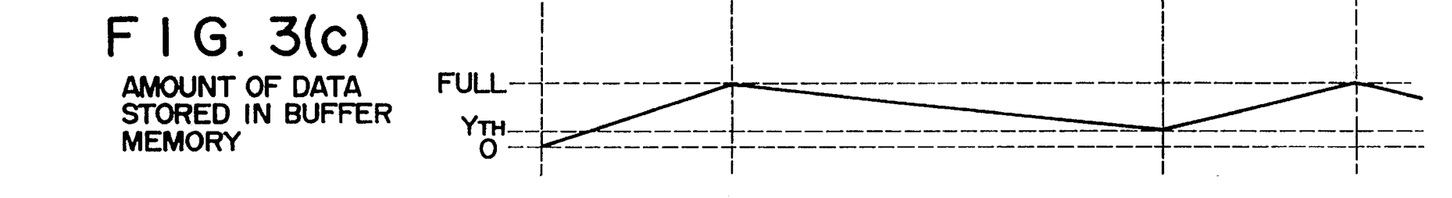
FIG. 3(c) shows the manner in which the amount of data stored in the buffer memory varies.
Figure 4A:
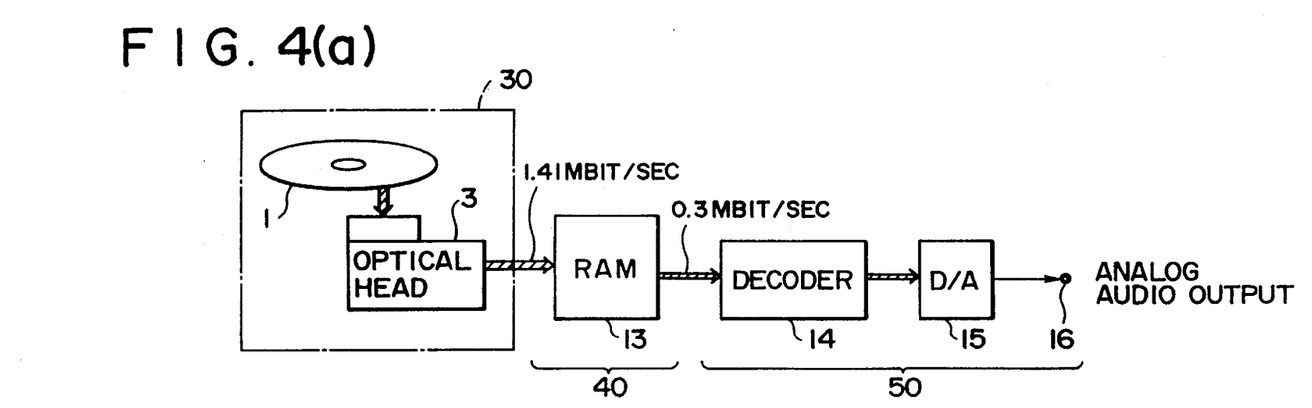
FIG. 4(a) shows a flow of reproduced data up to a time $t_1$ in FIGS. 3(a) through 3(c).

Such intermittent operation is illustrated in FIGS. 3(a) through 3(c) and 4(a) and 4(b). If a reproducing process starts at a time $t_0$, then data start to be read from the magneto-optical disc 1 and stored in the buffer memory 13 by the data recording and/or reproducing unit 30. Immediately thereafter, the data start to be read from the buffer memory 13, and a reproduced audio signal starts being outputted (see FIGS. 3(a) and 3(b)). A flow of reproduced data up to a time $t_1$ is schematically shown in FIG. 4(a).

If the buffer memory 13 stores data to its full storage capacity at the time $t_1$ in FIG. 3(c), then the reading of data from the magneto-optical disc 1 and storing of data in the buffer memory 13 are stopped at the time $t_x$. No data are read from the magneto-optical disc 1 and stored in the buffer memory 13 until a time $t_2$ when the amount of data stored in the buffer memory 13 decreases to a level $Y_{TH}$. A flow of reproduced data between the times $t_1$ and $t_2$ is schematically shown in FIG. 4(b).

From the time, $t_2$ when the amount of data stored in the buffer memory 13 decreases to the level $Y_{TH}$ to a time $t_3$ when the buffer memory 13 stores data to its full storage capacity, the data recording and/or reproducing unit 30 continuously reads data from the magneto-optical disc 1 and stores the data in the buffer memory 13.

Figure 4B:
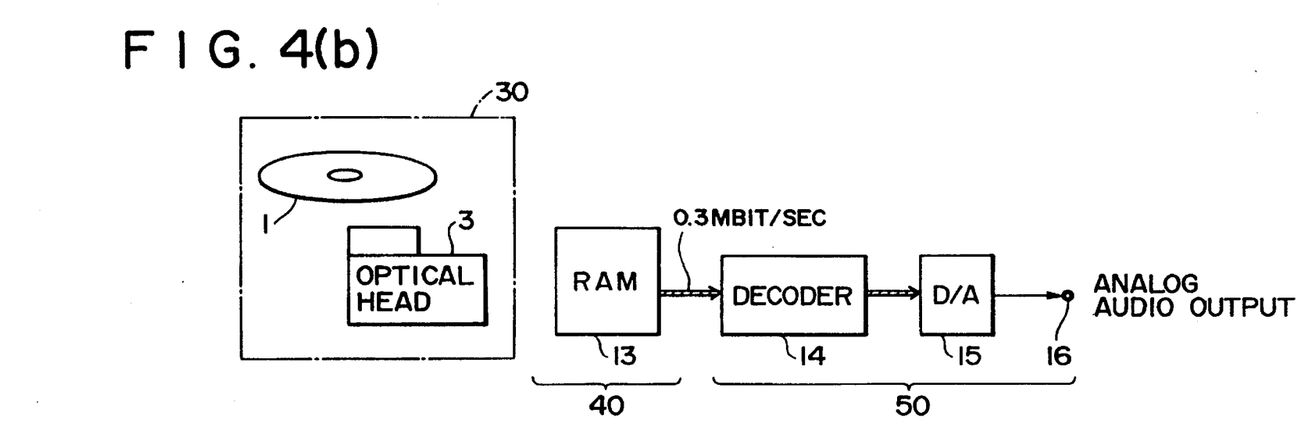
FIG. 4(b) shows the condition in which the supply of data to the buffer memory is stopped.

While the data recording and/or reproducing unit 30 is not actually supplying data to the buffer memory 13 as shown in FIG. 4(b), the optical head 3 is controlled to pause or be temporarily stopped, repeating a single track jump to scan one track, until it is to supply data from a next track.

By thus outputting a reproduced audio signal through the buffer memory 13, the output of the reproduced audio signal is not interrupted even if the optical head 3 is forced out of proper tracking due to disturbance while it is reading data. While data still remain stored in the buffer memory 13, the optical head 3 may access a proper tracking position on the magneto-optical disc 1, and resume reading data from the magneto-optical disc 1. Accordingly, the optical head 3 can continue its operation without adversely affecting the reproduced output signal. The recording and reproducing apparatus is therefore highly resistant to vibrations or shocks.

Decoded address information and subcoded data for control operations, which are outputted from the address decoder 10, are supplied through the encoder/decoder 8 to the system controller 11 for use in various control operations.

A lock-detected signal from a PLL circuit which generates a bit clock for recording/reproducing operation, and a monitor signal indicative of a dropout of a frame synchronizing signal for reproduced data (left and right channels) are also supplied to the system controller 11.

The system controller 11 outputs a control signal $S_{LP}$ for controlling the operation of the laser diode in the optical head 3 to turn on and off the light beam emission from the laser diode. When the light beam emission from the laser diode is turned on, the system controller 11 can switch between a relatively low level of light beam output power for the reproducing mode and a relatively high level of light beam output power for the recording mode.

For recording data on the magneto-optical disc 1, an analog audio signal supplied as a signal to be recorded to a terminal 17 is converted into digital data by an A/D converter 18. The digital data are supplied to the encoder/decoder 14, which compress the audio data. The compressed data from the encoder/decoder 14 are temporarily stored in the buffer memory 13 by the memory controller 12, and then read at a predetermined time and supplied to the encoder/decoder 8. The data are then CIRC-encoded and EFM-modulated by the encoder/decoder 8, and supplied to a magnetic head driver 15.

Depending on the encoded and modulated data, the magnetic head driver 15 supplies a magnetic head drive signal to the magnetic head 6, i.e., applies an N- or an S-pole vertical magnetic field from the magnetic head 6 to the magneto-optical disc 1. At this time, the system controller 11 supplies the optical head 3 with a control signal to output a light beam of the recording-mode level.

In the recording operation, entered data are delivered through the buffer memory 13. As with the above-described reproducing operation, since the data are written in and read from the buffer memory 13 at different transfer rates, the data are intermittently recorded on the magneto-optical disc 1 by the data recording and/or reproducing unit 30. Specifically, the data supplied from the encoder/decoder 14 to the buffer memory 13 are continuously written in the buffer memory 13. The written data are intermittently read from the buffer memory 13 at the higher transfer rate and supplied to the encoder/decoder 8. Only while the data are being intermittently read from the buffer memory 13, the data are recorded on the magneto-optical disc 1 by the magnetic head 6 and the optical head 3.

To the system controller 11, as shown in FIG. 1, there are connected an input unit 19 having keys that can be operated by the user and a display unit 20 which is composed of a liquid crystal display unit, for example. The keys of the input unit 19 include a record key, a playback key, a stop key, an AMS key, a search key, and other keys for operation by the user.

A temperature detector 21, which may compose a thermistor, for example, is disposed near the optical head 3, for example. The temperature detector 21 detects the temperature around the optical head 3, and supplies a signal indicative of the detected temperature to the system controller 11.

Figure 5:
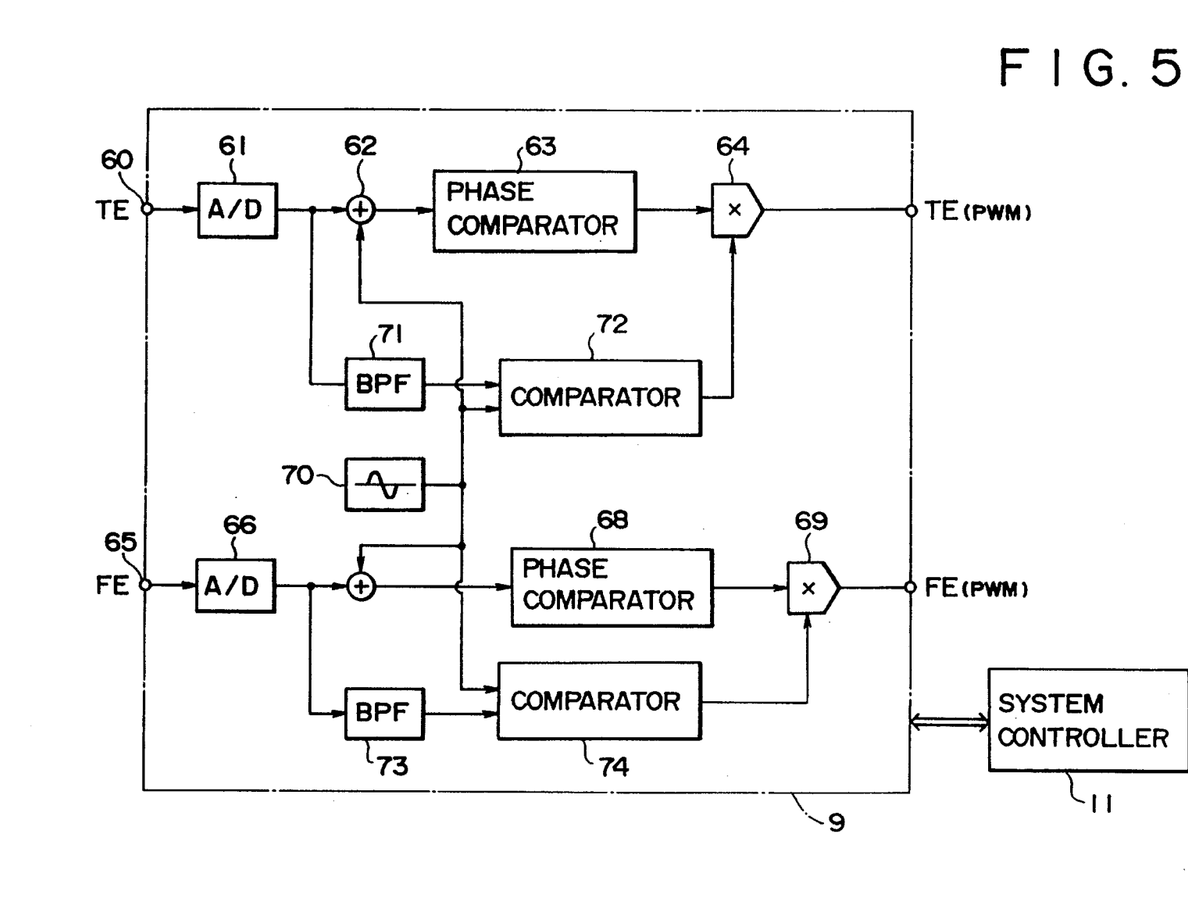
FIG. 5 is a block diagram of a servo control circuit of the recording and reproducing apparatus shown in FIG. 1.

The servo control circuit 9, which is capable of automatically adjusting servo control gains, will be described in detail below with reference to FIG. 5. FIG. 5 only shows circuit systems for generating tracking and focusing servo drive signals (PWM signals) in the servo control circuit 9, which is in the form of a digital processing circuit. A servo control system for the feed mechanism 5, a servo control system for the spindle motor 2, and a circuit system for effecting a focusing search are omitted from illustration in FIG. 5.

As shown in FIG. 5, the servo control circuit 9 has an input terminal 60 for being supplied with a tracking error signal TE that is produced by the RF amplifier 7 as the difference (E–F) between output signals E, F from a pair of side spot detectors in the optical head 3.

The tracking error signal TE from the input terminal 60 is converted by an A/D converter 61 into digital data, which are then supplied through an adder 62 to a phase compensator 63. The phase-compensated data from the phase compensator 63 are supplied to a multiplier 64, which multiplies the data by a predetermined coefficient thereby to generate a tracking drive signal TE as a PWM (pulse-width-modulated) signal to which a certain servo control gain is given. The tracking drive signal TE as a PWM is band-limited by a low-pass filter (not shown), and then applied through a servo drive circuit to a tracking coil of the actuator 4 for tracking control of the objective lens 3a.

The servo control circuit 9 also has an input terminal 65 for being supplied with a focusing error signal FE that is produced by the RF amplifier 7 as the difference {(A+D)–(B+C)} between the sums of output signals A, B, C, D from four-segment detectors in the optical head 3.

The focusing error signal FE from the input terminal 65 is converted by an A/D converter 66 into digital data, which are then supplied through an adder 67 to a phase compensator 68. The phase-compensated data from the phase compensator 68 are supplied to a multiplier 69, which multiplies the data by a predetermined coefficient thereby to generate a focusing drive signal FE as a PWM signal to which a certain servo control gain is given. The focusing drive signal FE is band-limited by a low-pass filter (not shown), and then applied through a servo drive circuit to a focusing coil of the actuator 4 for focusing control of the objective lens 3a.

Ordinary tracking and focusing servo control operations are carried out by the above circuit arrangement. The servo control circuit 9 additionally includes a circuit for automatically adjusting a servo control gain as follows:

The servo control circuit 9 has a sine-wave ROM 70 for storing sine-wave data of 1 KHz, for example. The sine-wave ROM 70 outputs the stored sine-wave data in response to an automatic servo control gain adjustment command from the system controller 11. The servo control circuit 9 also has a band pass filter 71 for extracting the sine-wave data of 1 KHz from the tracking error signal TE as converted into digital data by the A/D converter 61, and a comparator 72 for comparing the output data from the sine-wave ROM 70 and the output data from the band pass filter 71, and varying the multiplication coefficient to determine the servo control gain in the multiplier 64 depending on the result of comparison.

The system controller 11 outputs an automatic servo control gain adjustment command to the servo control circuit 9 at a prescribed time.

Then, the sine-wave ROM 70 outputs the stored sine-wave data. In the tracking servo control system, the sine-wave data are supplied to the adder 62 and the comparator 72. The adder 62 adds the sine-wave data to the tracking error signal TE. Based on the tracking error signal TE with the sine-wave data added thereto, a tracking drive signal is generated to operate the actuator 4.

In response to the operation of the actuator 4 with the tracking drive signal which contains the sine-wave data, the RF amplifier 7 outputs a tracking error signal TE that is converted into digital data by the A/D converter 61 in the servo control circuit 9. The band pass filter 71 extracts the sine-wave data from the tracking error signal TE in the form of digital data from the A/D converter 61, and supplies the extracted sine-wave data to the comparator 72.

The comparator 72 compares the sine-wave data from the band pass filter 71 and the sine-wave data from the sine-wave ROM 70, and detects a tracking servo control gain status thereby to measure a tracking servo control gain. While measuring the tracking servo control gain, the comparator 72 varies the gain coefficient in the multiplier 64 to optimize the tracking servo control gain.

The focusing servo control system operates in the same manner as described above. When the system controller 11 outputs an automatic servo control gain adjustment command to the servo control circuit 9, the sine-wave ROM 70 outputs the stored sine-wave data, which are supplied to the adder 67 and the comparator 74. The adder 67 adds the sine-wave data to the focusing error signal FE. Based on the focusing error signal FE with the sine-wave data added thereto, a focusing drive signal is generated to operate the actuator 4.

In response to the operation of the actuator 4 with the focusing drive signal which contains the sine-wave data, the RF amplifier 7 outputs a focusing error signal FE that is converted into digital data by the A/D converter 66 in the servo control circuit 9. The band pass filter 73 extracts the sine-wave data from the focusing error signal FE in the form of digital data from the A/D converter 66, and supplies the extracted sine-wave data to the comparator 74.

The comparator 74 compares the sine-wave data from the band pass filter 73 and the sine-wave data from the sine-wave ROM 70, and detects a focusing servo control gain status thereby to measure a tracking servo control gain. While measuring the focusing servo control gain, the comparator 74 varies the gain coefficient in the multiplier 69 to optimize the focusing servo control gain.

Figure 6:
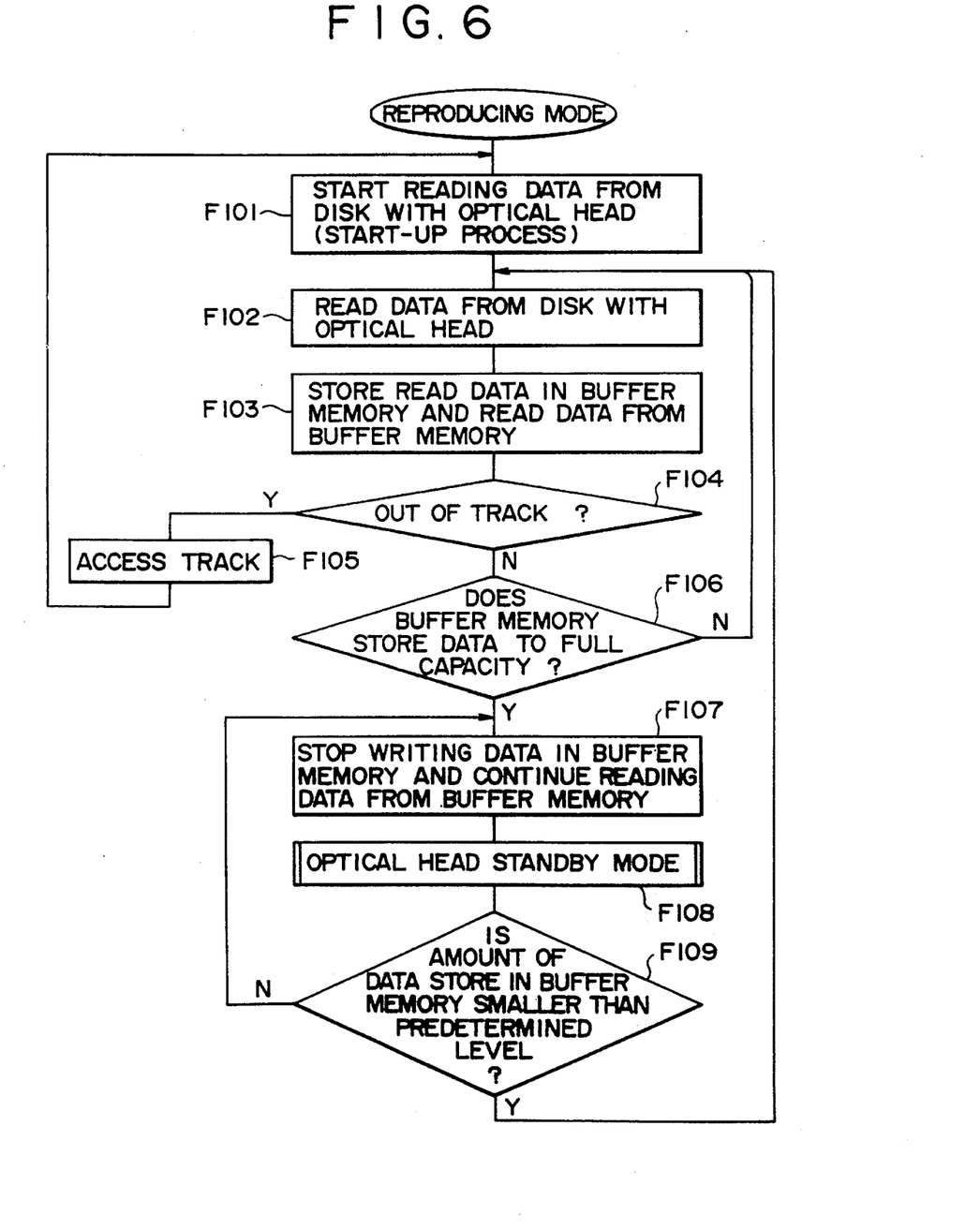
FIG. 6 is a flowchart of a reproducing process of the recording and reproducing apparatus shown in FIG. 1.
Figure 7:
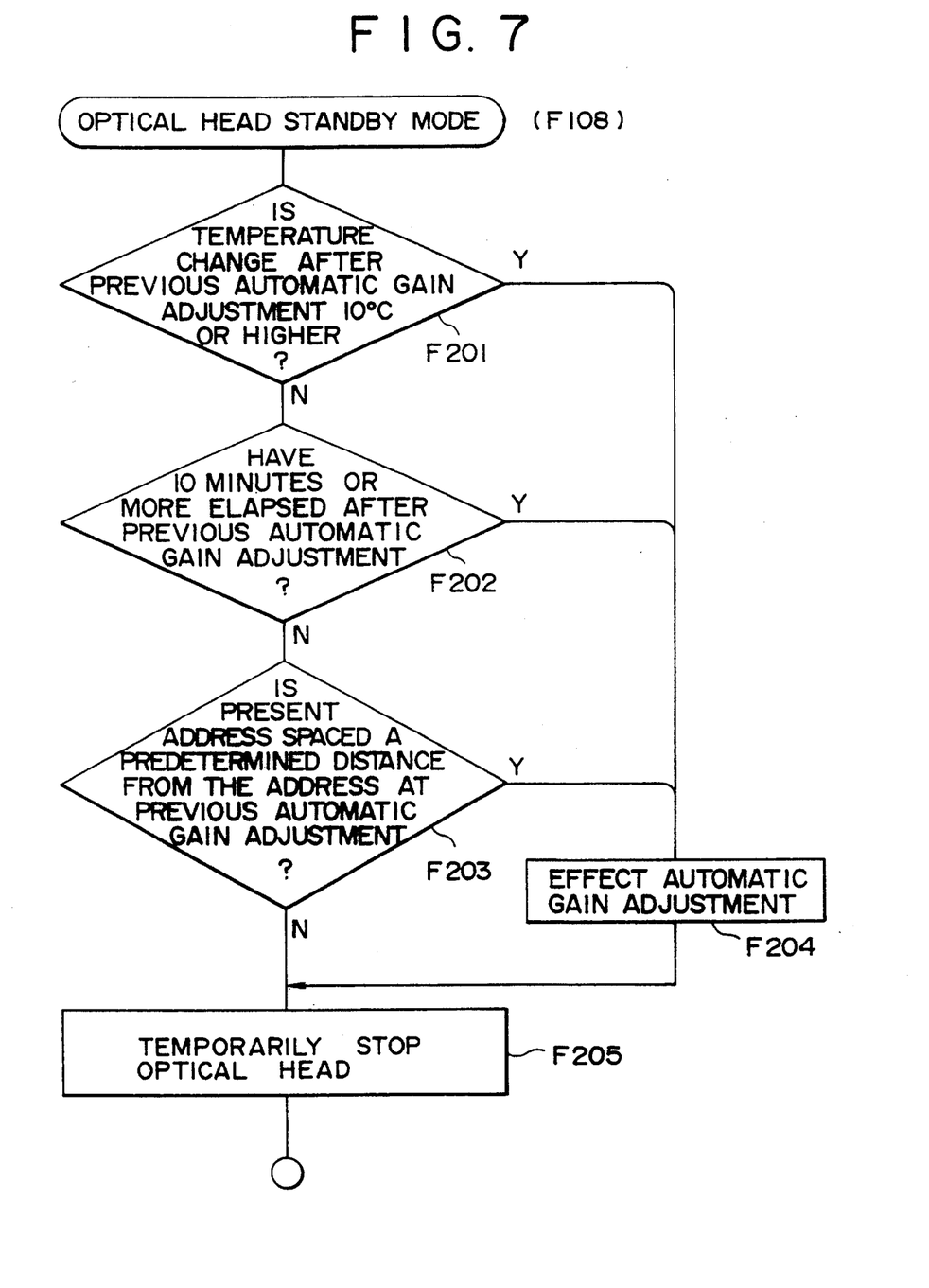
FIG. 7 is a flowchart of a process of keeping an optical head in a standby mode during a reproducing process.

A process of automatically adjusting the servo control gains in the recording and reproducing apparatus with the above servo control circuit 9 will be described below with reference to FIGS. 6 and 7. FIGS. 6 and 7 show flowcharts of control operations of the system controller 11 for various parts of the recording and reproducing apparatus.

While the process of automatically adjusting a servo control gain will be described in a reproducing mode, substantially the same process can be carried out in a recording mode. Therefore, the process of automatically adjusting a servo control gain in a recording mode will not be described below.

When the user operates the input unit 19 to initiate a reproducing mode, data recorded on the magneto-optical disc 1 start being reproduced, and the control operation shown in FIG. 6 starts being executed.

Since the data recording and/or reproducing unit 30 has to be operated in order to reproduce data from the magneto-optical disc 1, the system controller 11 first operates the data recording and/or reproducing unit 30 to carry out a reproducing mode in a step F101. Specifically, after the system controller 11 controls the optical head 3 to output a-light beam of the recording-mode level, the system controller 11 instructs the servo control circuit 9 to execute a focusing search. The system controller 11 controls the servo control circuit 9 to drive the actuator 4 until it reaches a focusing control region, after which a focusing servo loop is closed, and the system controller 11 controls the focusing servo control system to effect a focusing servo control process. The system controller 11 instructs the servo control circuit 9 to energize the spindle motor 2 and control the rotational speed thereof so that it reaches a predetermined speed. After the focusing servo loop is closed, the system controller 11 controls the tracking servo control system to effect a tracking servo control process. When the above start-up procedure is completed, it becomes possible to read data from the magneto-optical disc 1, and hence the system controller 11 controls the optical head 3 to reproduce data from the magneto-optical disc 1 in a step F102. Now, a readout signal is outputted from the optical head 3. It takes about 1 to 2 seconds until the start-up procedure is completed.

Simultaneously with the operation of the data recording and/or reproducing unit 30 to read data from the magneto-optical disc 1, the system controller 11 controls the memory controller 12 to write and read data in the temporary data storage unit 40 in a step F103.

Audio data read by the optical head 3 are CIRC-decoded and EFM-demodulated by the encoder/decoder 8, and stored in the buffer memory 13 at a rate of 1.41Mbit/sec. At the same time, the stored data are read from the buffer memory 13 at a rate of 0.3 Mbit/sec. As described above, excessive data that are produced due to the difference between the transfer rate at which data are written into the buffer memory 13 and the transfer rate at which data are read from the buffer memory 13 are stored in the buffer memory 13.

If the storage capacity of the buffer memory 13 is 4 Mbit, for example, then the buffer memory 13 can fully store data for about 10 seconds at maximum.

During the reproducing process, the operation of the buffer memory 13 is controlled to write and read data in the manner described above. The data read from the buffer memory 13 are processed by the encoder/decoder 14, and converted by the D/A converter 15 into analog data, which are outputted as an audio signal from the terminal 16. The reproduced data flow as shown in FIG. 4(a).

This operation, i.e., the loop composed of steps F102–F106, is continued until reproduced data are stored in all the reproduced data storage regions of the buffer memory 13, i.e., until the time $t_1$ in FIGS. 3(a) through 3(c).

Specifically, the system controller 11 detects the amount of data stored in the buffer memory 13 based on information from the memory controller 12, and determines whether the stored amount of data has reached the full storage capacity of the buffer memory 13 or not in a step F106.

If the optical head 3 happens to be shifted out of track due to disturbance or the like while in the loop of steps F102–F106, then control goes from a step F104 to a step F105 in which the system controller 11 effects a track access operation to return the optical head 3 back to a correct track or scanning position. The system controller 11 carries out a start-up procedure again in the step F101 and controls the optical head 3 to resume reading data from the magneto-optical disc 1 in the step F102. At this time, since a certain amount of data has been stored in the buffer memory 13, data are continuously read from the buffer memory 13, and hence the reproduced audio signal is not interrupted.

If the buffer memory 13 stores data to its full storage capacity while in the loop of steps F102–F106, then the system controller 11 stops writing data in the buffer memory 13 and continues to read the stored data from the buffer memory 13 in a step F107. The system controller 11 controls the optical head 3 and the servo control circuit 9 to effect a process of keeping the optical head 3 in a standby mode.

At this time, inasmuch as the buffer memory 13 stores data for about 10 seconds, the data are continuously read from the buffer memory 13, and hence the reproduced analog signal is continuously outputted from the terminal 16. Thus, because of the reproduced data flow shown in FIG. 4(b), no audio output is interrupted.

The system controller 11 always detects the amount of data stored in the buffer memory 13 based on information from the memory controller 12, and compares the detected amount of stored data with a preset reference, e.g., an amount of stored data corresponding to reproduced data for 5 seconds, for example, i.e., the level $Y_{TH}$ in FIG. 3(c), in a step F109. The loop of steps F107–F109 is executed until the amount of stored data decreases to the preset amount of data for 5 seconds.

The process of keeping the optical head 3 in a standby mode in the step F108 will be described below with reference to FIG. 7.

In this process, the system controller 11 temporarily stops the operation of the optical head 3, and, in some cases, may controls the servo control circuit 9 to effect the process of automatically adjusting the servo control gains.

First, the system controller 11 reads temperature information from the temperature detector 21. The system controller 11 updates and retains the temperature information each time it automatically adjusts the servo control gains. Therefore, when the system controller 11 reads temperature information from the temperature detector 21, the system controller 11 retains the temperature information which has been obtained in the previous process of automatically adjusting the servo control gains.

The system controller 11 compares the temperature information read from the temperature detector 21 with the temperature information which has been obtained in the previous process of automatically adjusting the servo control gains, and determines whether there is a temperature change of 10° C. or greater in a step F201.

The system controller 11 has an internal timer 11a which is reset to start measuring time each time it effects the process of automatically adjusting the servo control gains. The time that has elapsed from the previous process of automatically adjusting the servo control gains is measured by the timer 11a. If there is not a temperature change of 10° C. or greater in the step F201, then the system controller 11 detects the time measured by the timer 11a.

Based on the detected time measured by the timer 11a, the system controller 11 determines whether 10 minutes have elapsed from the previous process of automatically adjusting the servo control gains or not in a step F202.

If not elapsed, then the system controller 11 detects a present address position.

Address information is supplied, from time to time, to the system controller 11 in the reproducing operation of the data recording and/or reproducing unit 30. The system controller 11 updates and retains address information each time it automatically adjusts the servo control gains. Therefore, when the system controller 11 is supplied with address information, the system controller 11 retains the address information which has been obtained in the previous process of automatically adjusting the servo control gains.

The system controller 11 compares the supplied address information with the address information which has been obtained in the previous process of automatically adjusting the servo control gains, and calculates the radial distance between scanned positions on the magneto-optical disc 1 which correspond to the respective items of address information. The system controller 11 determines whether the calculated distance is of a predetermined value or greater, i.e., whether the present position is radially spaced a predetermined distance from the previous position in which the previous process of automatically adjusting the servo control gains has been carried out, in a step F203. For example, if the previous process of automatically adjusting the servo control gains is carried out in a relatively radially inner position, then the system controller 11 determines whether the present position is in a radially middle or outer area and spaced from the relatively radially inner position by the predetermined distance.

If not spaced by the predetermined distance, then control proceeds to a step F205 in which no process of automatically adjusting the servo control gains is carried out, but the optical head 3 is temporarily stopped.

Specifically, the system controller 11 controls the servo control circuit 9 to cause the optical head 3 to repeat a single track jump radially inwardly to continue scanning one track. At the same time, the system controller 11 controls the encoder/decoder 8 not to effect any decoding operation.

If the temperature change is 10° C. or more in the step F201, or if 10 minutes have elapsed in the step F202, or if spaced by the predetermined distance in the step F203, then the system controller 11 issues a command to the servo control circuit 9 to carry out a process of automatically adjusting the servo control gains in a step F204.

In the automatic servo control gain adjusting process, the servo control circuit 9 outputs-sine-wave data from the sine-wave ROM 70 and adds the data to a servo error signal. Then, the servo control circuit 9 compares the sine-wave data of the servo error signal and the sine-wave data from the sine-wave ROM 70 to adjust a servo control gain. When the automatic servo control gain adjusting- process in the step F204 is completed, the system controller 11 temporarily stops the optical head 3 in the step F205.

If the amount of data stored in the buffer memory 13 decreases to the preset amount of data for 5 seconds while in the loop composed of steps F107, F108, F109, then control goes back from the step F109 to the step F102 in which the system controller 11 controls the data recording and/or reproducing unit 30 to resume reading reproduced data from the previous position where the optical head 3 has been temporarily stopped.

The read data are written in the buffer memory 13 at a high transfer rate in the step F103 until the buffer memory 13 stores the data to its full storage capacity in the steps F102~F106.

The above process is repeated to effect the automatic servo control gain adjusting process as required while the optical head 3 is in the standby mode, while the optical head 3 is pausing, and during the period $t_1$~$t_2$ in FIGS. 3(a) through 3(c). Accordingly, the recording and reproducing apparatus can have an optimum servo control gain which satisfies various conditions including a temperature change, aging, the condition in which the apparatus is used, the type of the disc, and a radial positional difference on the disc, and hence has a highly improved data reproducing capability. During the automatic servo control gain adjusting process, since no data are read from the magneto-optical disc 1 by the data recording and/or reproducing unit 30, any reproduced audio signal is not adversely affected by a sine-wave signal that is added to a servo control signal upon automatic servo control gain adjustment.

The automatic servo control gain adjusting process is carried out also in a recording mode for optimizing the servo control gains in the recording mode.

In the illustrated embodiment, the system controller 11 determines whether the automatic servo control gain adjusting process is to be carried out or not based on conditions including a temperature change, an elapsed time, and address information. However, the system controller 11 may determine whether the automatic servo control gain adjusting process is to be carried out or not based on one of these conditions, or based on other conditions than these conditions. The temperature change and the elapsed time employed in determining whether the automatic servo control gain adjusting process is to be carried out or not are not limited to 10° C. and 10 minutes, respectively.

While the present invention has been described as being embodied in a recording and reproducing apparatus, the principles of the present invention are also applicable to a reproducing apparatus or a recording apparatus. Furthermore, the present invention may be embodied in a reproducing apparatus which employs an optical disc such as a CD or the like, rather than a magneto-optical disc. Specifically, the principles of the present invention-are applicable to any apparatus which include a buffer memory connected in a stage following a data reading unit for storing a certain amount of data at all times while data are being read from a CD at a twice transfer rate.

Although a certain preferred embodiment of the present invention has been shown and described in detail, it should be understood that various changes and modifications may be made therein without departing from the scope of the appended claims.

What is claimed is:

1. A recording and/or reproducing apparatus comprising:

recording and/or reproducing means for recording data on a recording medium and/or reproducing recorded data from the recording medium;

memory means for temporarily storing data outputted from said recording and/or reproducing means or input data to be recorded on the recording medium by said recording and/or reproducing means;

memory control means for controlling said memory to write and read data such that data are read from said memory means in a unit of time at a transfer rate lower than the transfer rate at which data are written in said memory means in a unit of time;

servo control means for supplying a servo control signal to said recording and/or reproducing means, said servo control means having an adjustable servo control gain; and system control means for controlling operation of said recording and/or reproducing means, said memory control means, and said servo control means;

wherein the input data are recorded on the recording medium through said memory means and the data reproduced from the recording medium are outputted through said memory means;

said system control means comprising means for temporarily interrupting the recording of data on the recording medium or the reproducing of data .from the recording medium with said recording and/or reproducing means based on the amount of data stored in said memory means, and controlling said servo control means and said recording and/or reproducing means to automatically adjust the servo control gain while the recording or reproducing of data is temporarily interrupted.

2. A recording and/or reproducing apparatus according to claim 1, wherein said servo control means comprises an A/D converter for converting said error signal into a digital signal, a waveform data generator for outputting gain adjusting waveform data, an adder for adding the digital signal outputted from said A/D converter and the gain adjusting waveform data generated by said waveform data generator, a multiplier for multiplying an output signal from said adder by a predetermined coefficient to generate a servo control signal, a filter for extracting the gain adjusting waveform data from the digital signal outputted from said A/D converter, and a comparator for varying said coefficient based on the result of comparison between the gain adjusting waveform data generated by said waveform data generator and an output signal from said filter.

3. A recording and/or reproducing apparatus according to claim 1, the apparatus further comprises temperature detecting means for detecting an ambient temperature, said system control means comprising means for controlling said servo control means and said recording and/or reproducing means to automatically adjust the servo control gain of said servo-control means based on temperature information from said temperature detecting means.

4. A recording and/or reproducing apparatus according to claim 1, wherein said system control means includes timer means for measuring time, said system control means comprising means for controlling said servo control means and said recording and/or reproducing means to automatically adjust the servo control gain of said servo control means based on time information from said timer means.

5. A recording and/or reproducing apparatus according to claim 1, wherein said system control means comprises means for controlling said servo control means and said recording and/or reproducing means to automatically adjust the servo control gain of said servo control means based on address information extracted from the recording medium by said recording and/or reproducing means.

* * * * *